United States Patent
Khare

(10) Patent No.: US 9,313,555 B2
(45) Date of Patent: Apr. 12, 2016

(54) METHOD AND SYSTEM FOR TRACKING AND MANAGING PLAYBACK OF MULTIMEDIA CONTENT

(71) Applicant: SUREWAVES MEDIATECH PRIVATE LIMITED, Bangalore (IN)

(72) Inventor: Rajendra Kumar Khare, Bangalore (IN)

(73) Assignee: SUREWAVES MEDIATECH PRIVATE LIMITED, Bangalore (IN)

( * ) Notice: Subject to any disclaimer, the term of this patent is extended or adjusted under 35 U.S.C. 154(b) by 0 days.

(21) Appl. No.: 14/171,187

(22) Filed: Feb. 3, 2014

(65) Prior Publication Data

US 2014/0223459 A1 Aug. 7, 2014

(30) Foreign Application Priority Data

Feb. 6, 2013 (IN) .............................. 507/CHE/2013

(51) Int. Cl.
*H04H 60/33* (2008.01)
*H04H 60/32* (2008.01)
*H04H 20/14* (2008.01)
*H04H 60/29* (2008.01)
*H04N 21/81* (2011.01)
*H04N 21/8352* (2011.01)
*H04N 21/24* (2011.01)

(52) U.S. Cl.
CPC ............. *H04N 21/812* (2013.01); *H04H 20/14* (2013.01); *H04N 21/2407* (2013.01); *H04N 21/8352* (2013.01); *H04H 2201/90* (2013.01)

(58) Field of Classification Search
USPC ..................................... 725/9, 18, 19, 20, 22
See application file for complete search history.

(56) References Cited

U.S. PATENT DOCUMENTS

| | | | | |
|---|---|---|---|---|
| 5,200,822 A * | 4/1993 | Bronfin | ................... | H04N 17/00 348/473 |
| 2004/0025176 A1* | 2/2004 | Franklin | ................. | H04H 20/14 725/22 |
| 2007/0039018 A1* | 2/2007 | Saslow | ................... | G06Q 30/02 725/22 |
| 2007/0136782 A1* | 6/2007 | Ramaswamy | ......... | G11B 27/11 728/138 |
| 2009/0158318 A1* | 6/2009 | Levy | ...................... | G06F 21/125 725/32 |
| 2009/0187932 A1* | 7/2009 | Rathburn | ........... | G06Q 10/0637 725/9 |
| 2009/0320060 A1* | 12/2009 | Barrett | ................... | H04N 7/165 725/32 |
| 2011/0035255 A1* | 2/2011 | Dasher | ................... | G06Q 30/02 705/14.72 |
| 2011/0123062 A1* | 5/2011 | Hilu | ....................... | G06Q 30/02 382/100 |

\* cited by examiner

*Primary Examiner* — Pinkal R Chokshi
*Assistant Examiner* — Alexander Gee
(74) *Attorney, Agent, or Firm* — Barry Choobin; Patent 360 LLC

(57) ABSTRACT

A system and method for tracking and managing playback of advertisements is disclosed. The system includes a processor configured to process the multimedia content, including advertisements, and generate a video signature/audio signature corresponding to the multimedia content. The video/audio signature is subsequently embedded/superimposed on at least one of the frames of the multimedia advertisement. The system further includes a plurality of trackers placed at predetermined geographic locations and configured to detect the broadcast television signal, and determine whether the video signature/audio signature is present in the broadcast signal. Subsequently, the tracker generates a report comprising at least a time stamp indicating the time of broadcast of the advertisement having the audio/video signature.

10 Claims, 2 Drawing Sheets

METHOD AND SYSTEM FOR TRACKING AND MANAGING PLAYBACK OF MULTIMEDIA CONTENT

CROSS REFERENCE TO RELATED APPLICATION

The present application claims the priority of the Indian Provisional Patent Application No. 507/CHE/2013 filed on 6 Feb., 2013 having the title "real time reporting of television advertisements", and the contents of which are incorporated by reference herein.

BACKGROUND

1. Technical Field

The embodiments herein relates to systems for distribution of additional content including television commercials. Particularly, the embodiments herein relates to the field of monitoring the broadcast of advertisements.

2. Description of Related Art

For a television broadcast or a radio broadcast, it is often difficult, if not impossible to measure the effectiveness of an advertisement(s). Advertisements are inserted in between consecutive television programs or typically in advertisement slots which are typically available for a pre-determined period of time in-between the air time of a television program. Typically, the advertisements are recorded in a suitable electronic format and handed over to the television channel broadcasters, who would in turn arrange for the advertisements to be played back during pre-determined advertisement slots. However, there is no guarantee that these advertisements would be aired at those pre-determined advertisement slots.

Given the fact that the advertisement slots are billed given the duration of the advertisement, the popularity of the television channel and other related factors, the airing of advertisements needs to be tracked in order to ensure that the advertisers are indeed being charged for the services that they really make use of. The aforementioned scenario is equally applicable to radio broadcast wherein the advertisement slots are charged based on the duration of the advertisement and the popularity of the corresponding radio program, amongst other factors.

Therefore, there was felt a need for a system that could accurately track the playback of advertisements. There was also felt a need for a system that could verify whether the advertisements were actually aired at the relevant advertisement slots, as promised by channel broadcasters. There was also felt a need for a system that would generate a report accurately reflecting all the parameters involved in airing of advertisements on television/radio channels, thereby enabling advertisers to devise an effective and efficient advertising strategy.

Several attempts have been previously made in order to overcome the hitherto drawbacks. U.S. Pat. No. 8,571,931 envisaged a system and method for targeted distribution of advertisements. The system envisaged by this patent application includes an advertisement management system which monitors the states of one or more clients in the television distribution system and determines when an advertisement is required. The advertisement management system, on receiving a request for an advertisement retrieves one or more features that correspond to the subscribers in the television distribution system and subsequently selects a segmented program and the corresponding advertisement(s). However, this patent does not envisage tracking the airing of advertisements and determining whether the advertisements were really broadcasted or not.

US Patent Application Publication No. 20060195866 envisages a system that monitors television systems for power on/off state and a tuning configuration. The content provider provides advertising content to one or more television systems when they are powered on and configured to receive the advertising content. Subsequently, the content provider keeps a count on the number of television based systems that received the advertisement content and also on the number of television based system that in fact displayed the received advertisements. However, this patent application does not disclose, making use of video signatures/audio signatures to track the play back of advertisements.

US Patent Application Publication No. 20130173379 envisages a computer implemented method for monitoring the effectiveness of advertisement broadcasts. The method envisaged by this patent application involves the step of detecting that an is advertisement has been aired, and monitoring the broadcast network for the activity attributable to airing of the advertisement. Further, the method develops a quantitative relationship between the activity, for example, surfing the internet for the advertised product/service, and the number of listeners who listened to the advertisement. Firstly, the system envisaged by this patent application is restricted to radio broadcast network. Secondly, this patent application does not envisage making use of video signatures/audio signatures to track whether the advertisement was actually broadcasted or not.

WIPO Patent Application Publication No. 2008124541 teaches a computer implemented method for selecting an advertisement for broadcast. The method involves the steps of identifying the availability of a television advertisement, identifying a context associated with the television advertisement availability, receiving the parameters associated with the television advertisement, and selecting one or more advertisements. However, this patent application does not teach using audio/video signatures for tracking the playback of advertisements. Therefore, in view of the aforementioned drawbacks, there was felt a need for a system and method that can overcome the hitherto disadvantages.

The above mentioned shortcomings, disadvantages and problems are addressed herein and which will be understood by reading and studying the following specification.

Objects

An object of the embodiments herein is to provide a system that effectively tracks the playback of advertisements.

Yet another object of the embodiments herein is to provide a system that reports the playback of advertisements.

Yet another object of the embodiments herein is to provide a system that efficiently elicits all the information in respect of an advertisement broadcast.

Yet another object of the embodiments herein is to provide a system that tracks the broadcast signals to determine the airing of television advertisements.

Yet another object of the embodiments herein is to provide a system that tracks broadcast of television advertisements as well as advertisements on the radio network.

These and other objects and advantages of the embodiments herein will become readily apparent from the following detailed description taken in conjunction with the accompanying drawings.

SUMMARY

The embodiments herein envisage a computer implemented system for tracking and managing play-back of multimedia content. The system, in accordance with the embodiments herein comprises a server. The server includes a processor configured to process the multimedia content. The processor is configured to generate a video signature in the event the multimedia content is in video format, and generate an audio signature in the event the multimedia content is in audio format.

The system, in accordance with the embodiments herein further includes an embedding module cooperating with the processor and configured to embed the video signature/audio signature into a pre-determined number of frames of the multimedia content.

The system, in accordance with the embodiments herein includes a tracker installed at pre-determined locations. The tracker tracks the broadcast of the multimedia content. The tracker further time stamps the broadcast of the multimedia content, and generates a report indicating at least the time of broadcast of the multimedia content.

In accordance with the embodiments herein, the video signature comprises at least one pre-determined geometrical shape having pre-determined characteristics, the video signature generated by encoding at least one of the video frames using a pre-determined video encoding technique.

In accordance with the embodiments herein, the audio signature comprises at least one audio note, the audio note recognizable only to the tracker, the audio signature generated by encoding at least one of the audio frames using a pre-determined audio encoding technique.

In accordance with the embodiments herein, the embedding module is configured to superimpose the video signature/audio signature on at least one of the audio frame/video frame.

In accordance with the embodiments herein, the video-signature/audio signature is configured to identify at least the advertiser name, brand name, brand owner, and the corresponding product/service.

In accordance with the embodiments herein, the tracker is further configured to generate a report in real time, indicating broadcast of the multimedia content, wherein the report includes information corresponding to at least advertiser name, brand name, language, corresponding product/service, and media agency name.

The embodiments herein envisage a computer implemented method for tracking and managing play back of multimedia content. The method comprises the computer implemented steps of processing the multimedia content and generating a video signature in the event that the multimedia content is in video format, and generating an audio signature in the event that the multimedia content is in audio format; embedding the video signature/audio signature in to a pre-determined number of frames of the multi media content; installing a plurality of trackers at pre-determined geographic locations and tracking the broadcast of the multimedia content; time stamping the broadcast of the multimedia content, using the trackers: and generating a report indicating at least the time of broadcast of the multimedia content.

In accordance with the embodiments herein, the step of embedding the video signature/audio signature into a pre-determined number of frames of the multimedia content further includes the step of embedding a video signature comprising at least one pre-determined geometrical shape having pre-determined characteristics, wherein the video signature is generated by encoding at least one of the video frames using a pre-determined video encoding technique.

In accordance with the embodiments herein, the step of embedding the video signature/audio signature into a pre-determined number of frames of the multimedia content further includes the step of embedding an audio signature comprising at least one audio note recognizable only to the tracker, wherein the audio signature generated by encoding at least one of the audio frames using a pre-determined audio encoding technique.

The embodiments herein envisage a non transitory computer readable medium having computer readable instructions stored thereupon, the computer readable instructions when executed by a processor are configured to cause a computer enabled device to process the multimedia content and generating a video signature in the event that the multimedia content is in video format, and generating an audio signature in the event that the multimedia content is in audio format; embed the video signature/audio signature into a pre-determined number of frames of the multimedia content; track the broadcast of the multimedia content; time stamp the broadcast of the multimedia content, using the trackers; and generate a report indicating at least the time of broadcast of the multimedia content.

In accordance with the embodiments herein, the computer readable instructions are further configured to generate a video signature by encoding at least one of the video frames using a pre-determined video encoding technique; and generate an audio signature by encoding at least one of the audio frames using a pre-determined audio encoding technique.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Although the specific features of the embodiments herein are shown in some drawings and not in others. This is done for convenience only as each feature may be combined with any or all of the other features in accordance with the embodiments herein.

DETAILED DESCRIPTION OF THE EMBODIMENTS

In the following detailed description, reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The embodiments herein envisage a computer implemented system and method for managing and tracking of playback of advertisements. The system envisaged by the embodiments herein makes use of video signatures and audio signatures to track the playback of advertisements on television as well as radio.

Figure 1:
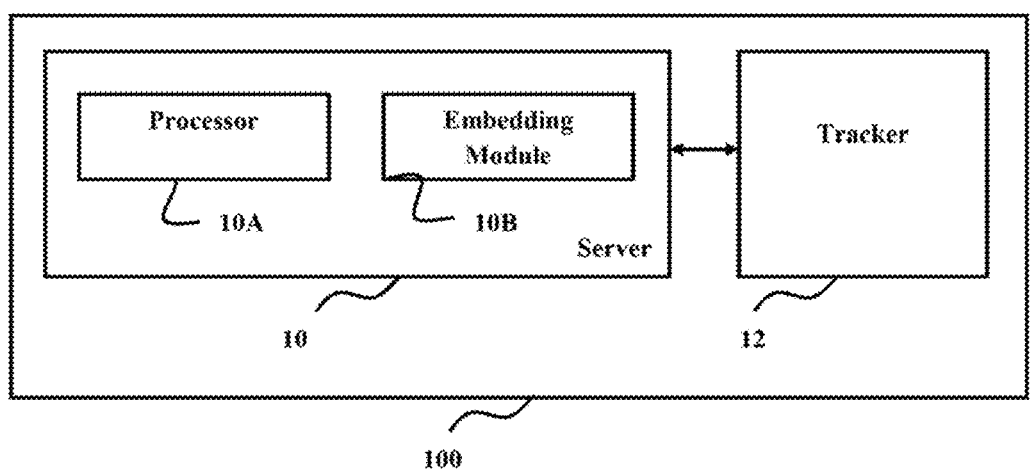
FIG. 1 is a system level block diagram illustrating the functional blocks of the system for tracking and managing the playback of advertisements, according to one embodiment herein.

Referring to FIG. 1 there is shown a system level block diagram illustrating the functional block of the computer implemented system 100 for managing and tracking the playback of advertisements. The system 100 in accordance with the embodiments herein includes a server 10 having access to the multimedia content including the advertisements. The server 10 comprises a processor 10A configured to process the multimedia content. The processor 10A is further configured to generate a video signature, in the event that that the multimedia content is a video based advertisement.

The processor 10A, in accordance with the embodiments herein processes the frames of the advertisement and subsequently generates a video signature which is to be included in at least one of the frames of the advertisement. The video signature, in accordance with the embodiments herein can be a numeric code which includes a sequence of numbers or alphabets or combinations thereof. Alternatively, the video signature could include pre-determined geometrical shapes, for example, a square, a rectangle, a circle and the like.

In one embodiment of the embodiments herein, the video signature comprises a geometrical shape having pre-defined structure. The video signature can either be a square, a rectangle, a circle and the like. In accordance with the embodiments herein the geometric structure includes a pre-determined shape, as explained above, a predetermined size (for example, a circle having a pre-determined diameter, or a rectangle having a predetermined perimeter) and a predetermined color (for example, red, yellow, green and the like). The shape, size and color of the geometric structure are collectively referred to as the 'parameters' of the video signature, hereafter in this document. The video signature, in case of the embodiments herein is modeled using well known modeling techniques. The video signature, in accordance with the embodiments herein is superimposed on at least one of the frames of the advertisement video, at a predetermined location.

The server 10, in accordance with the embodiments herein further includes an embedding module 10b configured to embed the video signature into at least one of the frames of the advertisement. The embedding module superimposes the video signature on at least one of the frames of the advertisement video by making use of well known pixel shading techniques, the explanation of which has not been provided herein for the sake of brevity.

In accordance with the embodiments herein, the parameters of the video signature are made unique in combination. For example, there would be only one video signature having a predetermined shape, predetermined color and predetermined size, and the video signature is mapped to a particular advertisement created by a particular advertiser, i.e., no two video signatures are the same in terms of their respective parameters. This distinction between the video signatures enables the advertisements (comprising these signatures) to be unique, and differentiable from one another. Further, the multimedia content (advertisement) comprising the audio/video signature is provided to television broadcasters for the purpose of broadcasting.

The system 100, in accordance with the embodiments herein includes a tracker denoted by reference numeral 12. A plurality of trackers 12B are installed at predetermined geographic locations. The tracker 12B is configured to track and receive the television broadcast signals (within a predefined transmission range) transmitted by the television broadcast systems over a broadcast network.

The tracker 12B can be coupled to a dish antenna (not shown in figures) which is configured to receive the television broadcast signals from the corresponding satellite. The tracker 12B is configured to analyze the received television broadcast signals to identify the presence of the corresponding video signature and determine based on the mapping between the parameters of the video signature and the corresponding advertiser, whether the broadcast signals contained the desired advertisement(s).

In accordance with the embodiments herein, the video signatures can be mapped on to the attributes corresponding to the advertisers (the attributes typically being stored in the form of a table in a database) including but not restricted to advertiser name, brand name, caption name, media agency name, tape-id, language, product or service and brand owner. In accordance with the embodiments herein, the tracker 12 time stamps the detection of the video signature during the broadcast of a television program and subsequently maps the video signature to the attributes including but not restricted to advertiser name, brand name, caption name, media agency name, tape-id, language, product/service name, and brand owner. Subsequently, the tracker 12 generates a report indicating at least the time of broadcast of advertisement, and the name of the channel in which the advertisement was broadcasted. The report generated by the tracker 12 typically includes parameters including but not restricted to brand name, caption name, media agency name, tape-id, language, product or service, and brand owner. In accordance with the embodiments herein, the report generated by the tracker 12 is compatible with popular media analytic tools such as but not limited to Media Express tool of TAM.

In accordance with the embodiments herein, the system 100 of the embodiments herein is configured to generate audio signatures. The procedure for generating audio signatures is similar to the process of generating video signatures; however the only difference being that the audio signature comprises an audio tone or an audio note that is not recognizable to the human ears but recognizable only by the tracker 12. The tracker 12, in this case is configured to process the audio advertisements (multimedia content) and determine whether the unique audio note/tone is present within the broadcasted multimedia content.

Figure 2:
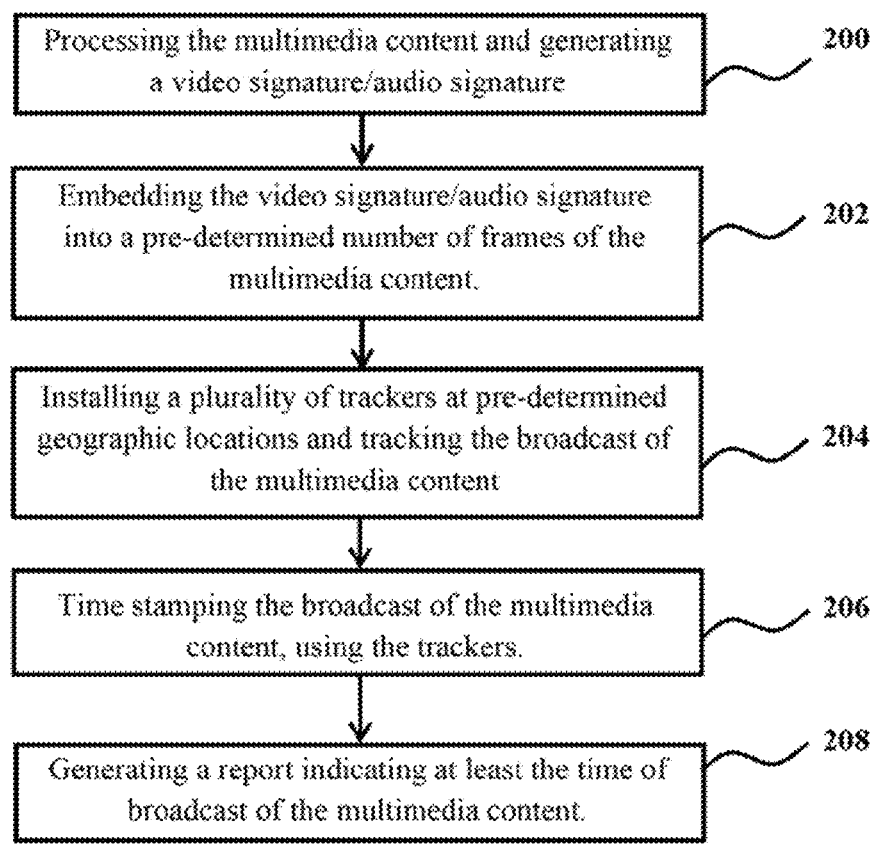
FIG. 2 is a flow chart illustrating the steps involved in the method for tracking and managing the playback of advertisements, according to one embodiment herein.

Referring to FIG. 2, there is shown a flow chart illustrating the steps involved in the method for tracking and managing playback of advertisements. The method in accordance with the embodiments herein includes the following steps: processing the multimedia content and generating a video signature in the event that the multimedia content is in video format, and generating an audio signature in the event that the multimedia content is in audio format 200; embedding the video signature/audio signature into a pre-determined number of frames of the multimedia content 202; installing a plurality of trackers at pre-determined geographic locations and tracking the broadcast of the multimedia content 204; time stamping the broadcast of the multimedia content, using the trackers 206; and generating a report indicating at least the time of broadcast of the multimedia content 208.

In accordance with the embodiments herein, the step of embedding the video signature/audio signature into a pre-determined number of frames of the multimedia content further includes the step of embedding a video signature comprising at least one pre-determined geometrical shape having pre-determined characteristics, wherein the video signature is generated by encoding at least one of the video frames using a pre-determined video encoding technique.

In accordance with the embodiments herein, the step of embedding the video signature/audio signature into a pre-determined number of frames of the multimedia content further includes the step of embedding an audio signature comprising at least one audio note recognizable only to the tracker, wherein the audio signature generated by encoding at least one of the audio frames using a pre-determined audio encoding technique.

The embodiments herein envisage a non transitory computer readable medium having computer readable instructions stored thereupon, the computer readable instructions when executed by a processor are configured to cause a computer enabled device to process the multimedia content and generating a video signature in the event that the multimedia content is in video format, and generating an audio signature in the event that the multimedia content is in audio format; embed the video signature/audio signature into a pre-determined number of frames of the multimedia content; track the broadcast of the multimedia content; time stamp the broadcast of the multimedia content, using the trackers; and generate a report indicating at least the time of broadcast of the multimedia content.

In accordance with the embodiments herein, the computer readable instructions are further configured to generate a video signature by encoding at least one of the video frames using a pre-determined video encoding technique; and generate an audio signature by encoding at least one of the audio frames using a pre-determined audio encoding technique.

The technical advantages of the system envisaged by the embodiments herein include the realization of a system that electively tracks the play back of advertisements. The system of the embodiments herein makes use of video signatures and audio signatures to track the play back of the advertisements the television network as well as the radio network. The system of the embodiments herein generates a video signature and embeds/superimposes the same on at least one of the frames of the advertisement so that the play back of the advertisement could be tracked using a tracker which is configured to listen to the television broadcast signals. The system envisaged by the embodiments herein also envisages generating audio signatures which comprise at least one audio note which is not recognizable to the human ear but can be identified up by the tracker. The system tracks, using the audio/video signature, the playback of the advertisements and subsequently generates a report indicating the playback, thereby enabling advertisers to effectively track the airing of the advertisements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

It is also to be understood that the following claims are intended to cover all of the generic and specific features of the embodiments described herein and all the statements of the scope of the embodiments which as a matter of language might be said to fall there between.

The invention claimed is:

1. A computer implemented system for tracking and managing play-back of multimedia content, the system comprising:
   a) a server having access to the multimedia content, the server comprising:
      i. a processor configured to process the multimedia content, and wherein the processor is further configured to generate a video signature in the event the multimedia content is in video format, and wherein the processor is further configured to generate an audio signature in the event the multimedia content is in audio format;
      ii. an embedding module cooperating with the processor and configured to embed the video signature, audio signature into a pre-determined number of frames of the multimedia content;
   b) a tracker installed at pre-determined geographic locations, and wherein the tracker is configured to track the broadcast of the multimedia content, and wherein the tracker is further configured to time stamp the broadcast of the multimedia content, and generate a report indicating at least the time of broadcast of the multimedia content, and wherein the tracker is further configured to generate a report in real time, and wherein the report includes combination corresponding to at least advertiser name, brand name, language, corresponding product/service and media agency name, and wherein the video signature comprises at least one pre-determined geometrical structures with predetermined geometrical shape, predetermined size and predetermined color, and wherein the video signature is mapped to a particular advertisement created by a particular advertiser, and wherein the video signatures are provided to enable the advertisements to be unique and distinguishable from one another, and wherein the audio signature comprises at least one audio note recognizable only to the tracker.

2. The system as claimed in claim 1, wherein the video signature is a numeric code, and wherein the numeric code includes a sequence of numbers or alphabets or a combination thereof, and wherein the video signature is generated by encoding at least one of the video frames using a predetermined video encoding technique.

3. The system as claimed in claim 1, wherein the audio signature is generated by encoding at least one of the audio frames using a pre-determined audio encoding technique.

4. The system as claimed in claim 1, wherein the embedding module is configured to superimpose the video signature, audio signature on at least one of the audio frames/video frames.

5. The system as claimed in claim 1, wherein the video-signature and audio signature are configured to identify at least the advertiser name, brand name, brand owner, and the corresponding product/service.

6. A computer implemented method for tracking and managing play back of multimedia content, the method comprising the computer implemented steps:

a) processing the multimedia content and generating a video signature in the event that the multimedia content is in a video format, and generating an audio signature in the event that the multimedia content is in an audio format;
b) embedding the video signature/audio signature into a pre-determined number of frames of the multimedia content;
c) installing a plurality of trackers at pre-determined geographic locations and tracking a broadcast of the multimedia content;
d) determining, based on a mapping between the parameters of the video signature/audio signature and corresponding advertiser, whether the broadcast multimedia content included a desired advertisement;
e) time stamping the broadcast of the multimedia content, using the plurality of trackers; and
(e) generating a report indicating at least the time of broadcast of the multimedia content in real time, and wherein the report includes combination corresponding to at least advertiser name, brand name, language, corresponding product/service and media agency name, and wherein the video signature comprises at least one pre-determined geometrical structures with predetermined geometrical shape, predetermined size and predetermined color, and wherein the video signature is mapped to a particular advertisement created by a particular advertiser, and wherein the video signatures are provided to enable the advertisements to be unique and distinguishable from one another, and wherein the audio signature comprises at least one audio note recognizible only to the tracker.

7. The method as claimed in claim 6, wherein the video signature is a numeric code, and wherein the numeric code includes a sequence of numbers or alphabets or a combination thereof, and wherein the video signature is generated by encoding at least one of the video frames using a pre-determined video encoding technique.

8. The method as claimed in claim 6, wherein the audio signature is generated by encoding at least one of the audio frames using a pre-determined audio encoding technique.

9. A non-transitory computer readable medium having computer readable instructions stored thereupon, the computer readable instructions when executed by a processor in a computing device are configured to cause a computer enabled device to:
a) process a multimedia content and generating a video signature in the event that the multimedia content is in video format, and generating an audio signature in the event that the multimedia content is in audio format;
b) embed the video signature/audio signature into a pre-determined number of frames of the multimedia content;
c) track the broadcast of the multimedia content;
d) time stamp the broadcast of the multimedia content, using a plurality of trackers installed at a plurality of predetermined geographic locations; and
e) generate a report indicating at least a time of broadcast of the multimedia content in real time, and wherein the report includes combination corresponding to at least advertiser name, brand name, language, corresponding product/service and media agency name, and wherein the video Signature comprises at least one pre-determined geometrical structures with predetermined geometrical shape, predetermined size and predetermined color, and wherein the video signature is mapped to a particular advertisement created by a particular advertiser, and wherein the video signatures are provided to enable the advertisements to be unique and distinguishable from one another, and wherein the audio signature comprises at least one audio note recognizable only to the tracker.

10. The non-transitory computer readable medium as claimed in claim 9, wherein the computer readable instructions, when executed by a processor are further configured to cause a computer enabled device to:
a) generate a video signature by encoding at least one of the video frames using a pre-determined video encoding technique; and
b) generate an audio signature by encoding at least one of the audio frames using a pre-determined audio encoding technique.

\* \* \* \* \*